United States Patent
Luttinen et al.

(10) Patent No.: US 7,891,684 B1
(45) Date of Patent: Feb. 22, 2011

(54) DECOUPLED 5-LINK INDEPENDENT REAR SUSPENSION

(75) Inventors: James L. Luttinen, Brighton, MI (US); Timothy J Schabel, Lapeer, MI (US); Michael A. Vieau, II, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/616,412

(22) Filed: Nov. 11, 2009

(51) Int. Cl.
*B60G 3/18* (2006.01)
(52) U.S. Cl. .............................................. 280/124.136
(58) Field of Classification Search .......... 280/124.128, 280/124.135, 124.136, 124.148
See application file for complete search history.

(56) References Cited

U.S. PATENT DOCUMENTS

| | | | | |
|---|---|---|---|---|
| 4,444,415 A | * | 4/1984 | von der Ohe | 280/124.144 |
| 4,709,935 A | * | 12/1987 | Takizawa et al. | 180/414 |
| 4,998,748 A | * | 3/1991 | Kashiwagi et al. | 280/5.524 |
| 5,000,477 A | * | 3/1991 | Minakawa et al. | 280/124.136 |
| 5,340,146 A | * | 8/1994 | Kato | 280/124.143 |
| 5,346,241 A | * | 9/1994 | Lee | 280/124.142 |
| 5,415,427 A | * | 5/1995 | Sommerer et al. | 280/124.142 |
| 5,507,510 A | * | 4/1996 | Kami et al. | 280/124.136 |
| 5,697,633 A | | 12/1997 | Lee | |
| 5,884,925 A | | 3/1999 | Wong | |
| 6,224,046 B1 | * | 5/2001 | Miyamoto | 267/281 |
| 7,048,286 B2 | * | 5/2006 | Eppelein | 280/124.106 |
| 2005/0046136 A1 | | 3/2005 | Sutton | |

FOREIGN PATENT DOCUMENTS

GB 2405381 A 3/2005

OTHER PUBLICATIONS

Wikepedia Online Encyclopedia: "Double Wishbone Suspension" http://en.wikipedia.org/wiki/Double_wishbone_suspension. Last update Sep. 23, 2009.
Wikepedia Online Encyclopedia: "Independent Suspension" http://en.wikipedia.org/wiki/Indenpendent_suspension. Llast update Jun. 23, 2009.
Wikepedia Online Encyclopedia: "Multi-link Suspension" http://en.wikipedia.org/wiki/Multi-link_suspension. Last update Sep. 22, 2009.
Wikepedia Online Encyclopedia: "Short Long Arms Suspension" http://en.wikipedia.org/wiki/Short_Long-Arms_Suspension. Last update Sep. 20, 2009.

* cited by examiner

*Primary Examiner*—Paul N Dickson
*Assistant Examiner*—Robert A Coker

(57) ABSTRACT

A decoupled 5-link independent rear suspension system (IRS) for motor vehicles. Three lateral linkages, the toe, camber and spring links, establish the wheel plane orientation and react to vertical and lateral loads, and two longitudinal links, the upper and lower trailing links, react to tractive loads and brake torques. The upper and lower trailing links are longitudinally orientated and disposed outboard of the body rail, thus allowing for improved load reactions of the suspension system, as well as optimization of the body rail configuration and space accommodation for other vehicle components, such as for example fuel, batteries and exhaust.

9 Claims, 5 Drawing Sheets

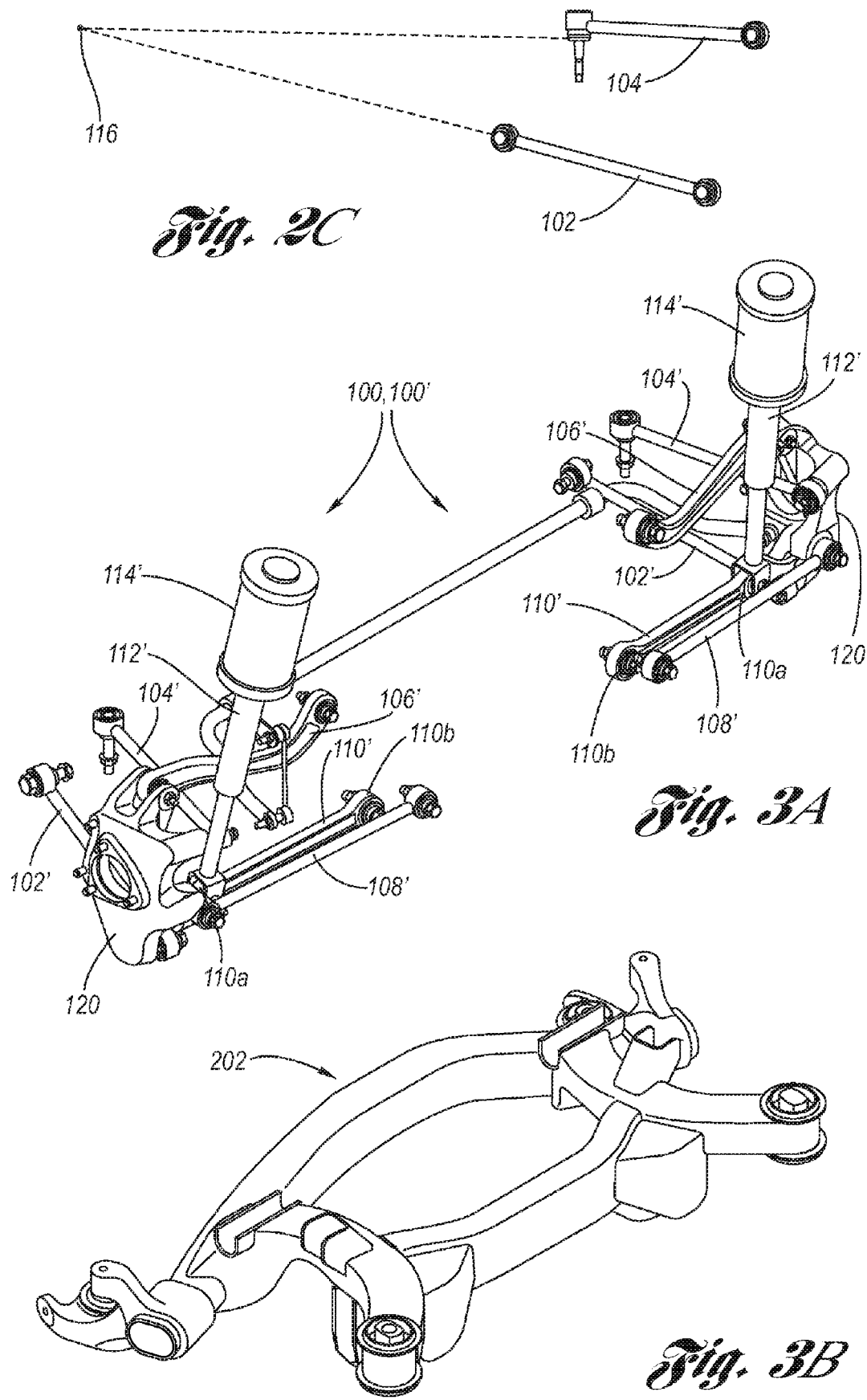

DECOUPLED 5-LINK INDEPENDENT REAR SUSPENSION

TECHNICAL FIELD

The present invention relates, in general, to suspension systems of motor vehicles, particularly to 5-link independent rear suspensions, and more particularly to a decoupled 5-link independent rear suspension.

BACKGROUND OF THE INVENTION

The role of suspension systems in motor vehicles is two fold; they serve to isolate the passengers from the irregularities of the road surface, and they also contribute to the control of the vehicle through managing the relative position of the tires to the vehicle body during vehicle operation. Suspension systems must perform these two functions over a variety of operating conditions, including steering, braking, and accelerating.

The term "independent suspension" refers to suspension systems which allow wheels on the same axle to move independently, that is, to react individually to the bumps and dips in the road surface. An independent rear suspension (IRS) features the rear wheels being independently sprung. In rear wheel driven vehicles, an IRS allows for a de-coupling of the differential from the axle thereby providing more room and lighter weight components. Even in front wheel drive vehicles, an IRS provides benefits, including controlling the camber angle for the rear tires during steering and braking.

One general type of IRS is referred to as a double wishbone suspension. This type of suspension is characterized by the presence of two sets of lateral "A" arms, typically called upper and lower control arms, and toe links. Each control arm has two attachments to the body and a single attachment to the wheel carrier or knuckle. The three knuckle attachments (upper arm, lower arm, toe link) on each side establish the plane of each wheel and control both camber angle and toe angle while reacting to wheel loads. Each side is separate from the other half which serves to independently isolate the reaction of each wheel to the road surface.

A more refined form of the double wishbone suspension is the multi-link suspension. This type of suspension conceptually separates the structural performance of each "A" arm into two tension/compression links. Thus, a 5-Link independent rear suspension can be thought of as separating the upper "A" arm into an "upper trailing link" and a "camber link", separating the lower "A" arm into a "lower trailing link" and a "spring link", and retaining a "toe link". The orientation and length of each link governs the suspension's geometric performance as well as the magnitude of link loading when wheel forces are reacted. The spatial distribution of the link body attachments also dissipates wheel loads over a wider portion of the vehicle structure.

FIGS. 1A and 1B depict an example of an arrangement of the components of a prior art conventional 5-link IRS 10. The lower trailing link 12 and the upper trailing link 14 constitute the longitudinal linkages of the conventional 5-link IRS 10, wherein these linkages serve to locate the wheel longitudinally and react to tractive loads and brake torques. Note that the lower and upper trailing links 12, 14 are located within the envelope of the subframe rail 16, which has been curved in order to provide accommodation space for the upper trailing link. The camber link 18, the toe link 20 and the spring link 22, constitute that portion of the conventional 5-link IRS which establishes the wheel plane orientation and reacts to vertical and lateral loads. Also depicted are a spring 24 and strut 26 showing their general spatial interrelationship with respect to the 5-link IRS 10. Note that all the links are attached to the knuckle or wheel carrier denoted by node 30.

Conventional multi-link suspensions orient the forward upper and lower "trailing" links in a substantially lateral orientation. This practice results in body side attachments inboard of the longitudinal rails which requires routing the rail up over the upper trailing links. This body rail configuration increases the rail offset which degrades its structural efficiency and also reduces the interior compartment volume above the rail. Additionally, the suspension attachment structure that is packaged inboard of the body rails reduces the under floor package space for fuel, batteries, and/or exhaust. Attaching the trailing links inboard of the body rails at large plan view angular orientations also causes higher link axial loads when reacting to longitudinal suspension loads.

Accordingly, what remains needed in the art is an improved 5-link IRS system for motor vehicles which can better manage the reaction of suspension longitudinal loads while providing features which enhance the package space and weight characteristics over that possible in the current art of 5-link IRS systems.

SUMMARY OF THE INVENTION

The present invention is a decoupled 5-link independent rear suspension system (IRS) for motor vehicles which can better manage the reaction of suspension longitudinal loads while providing features which enhance the package space and weight characteristics over the current art of S-link IRS systems.

The present invention consists of five linkages which have separated or decoupled load reactions, wherein three lateral linkages: the toe, camber and spring links, establish the wheel plane orientation and react to vertical and lateral loads, and two longitudinal links: the upper and lower trailing links, react to tractive loads and brake torques. According to the present invention, the positions of the upper and lower trailing links are more longitudinal in orientation when compared to conventional 5-link IRS systems. In particular, the trailing links are disposed outboard of the body rail, thus allowing for improved load reactions of the suspension system, as well as optimization of the body rail configuration and space accommodation for other vehicle components, such as for example fuel, batteries and exhaust.

A first feature of the decoupled 5-link IRS according to the present invention is a more efficient body structure packaging when compared to a conventional 5-link IRS in which both the upper trailing link and the lower trailing link are located within the envelope of the subframe rail such that the rail must be pushed out to accommodate these two linkages. This central area of the conventional 5-link IRS is congested, due to the volume occupied by the two linkages. In the decoupled 5-link IRS according to the present invention, since there is no coupling between the lateral and longitudinal linkages, there is more flexibility in the configuration of the different linkages allowing for a more efficient packaging.

A second feature of the present invention is a maximization of the underfloor package space ahead of the rear axle. In the process of creating a more efficient packaging of the linkages of the decoupled 5-link IRS of the present invention, space is freed up in the subfloor region of the vehicle between the floor and the suspension components forward of the rear axle. This additional space is crucial in alternatively powered vehicles, which may require additional space for such things as fuel, fuel cells, batteries, etc.

A third feature of the present invention is a reduction of suspension component loadings. In the process of separating the vertical, lateral and longitudinal loads, the 5-link independent rear suspension, according to the present invention, distributes the forces and loads more efficiently than the conventional 5-link independent rear suspension. This puts less stress on suspension components allowing for both a better ride and less wear and tear on the components themselves.

The decoupled 5-Link IRS keeps the forward attachment of the trailing links outboard of the body rail with the upper trailing link's attachment to the knuckle packaged rearward within the wheel environment to maximize linkage length while minimizing the suspension linkage longitudinal footprint. Compared to a conventional 4-Link IRS topology, the present invention enables the trailing links to be focused to a long side view swing arm length with a large side view swing arm angle, while minimizing the bushing coning of the lateral linkages. Compared to a conventional 5-Link topology, the decoupled longitudinal orientation of the trailing links of the present invention enables a softer wheel fore-aft stiffness with greater knuckle pitch stiffness.

Accordingly, it is the object of the present invention to provide a decoupled 5-link IRS system for motor vehicles which can better manage the reaction of longitudinal loads while providing features which enhance the package space and weight characteristics over the current suspension system art.

This and additional objects, features and advantages of the present invention will become clearer from the following specification of a preferred embodiment.

BRIEF DESCRIPTION OF THE DRAWINGS

FIG. 2C is a side view of the trailing links of FIG. 2A, showing their associated node.

FIG. 3A is a perspective view of a decoupled 5-link IRS according to the present invention for a rear wheel drive application.

FIG. 3B is a perspective view of a body rail for a rear wheel drive application.

DESCRIPTION OF THE PREFERRED EMBODIMENT

Figure 1A:
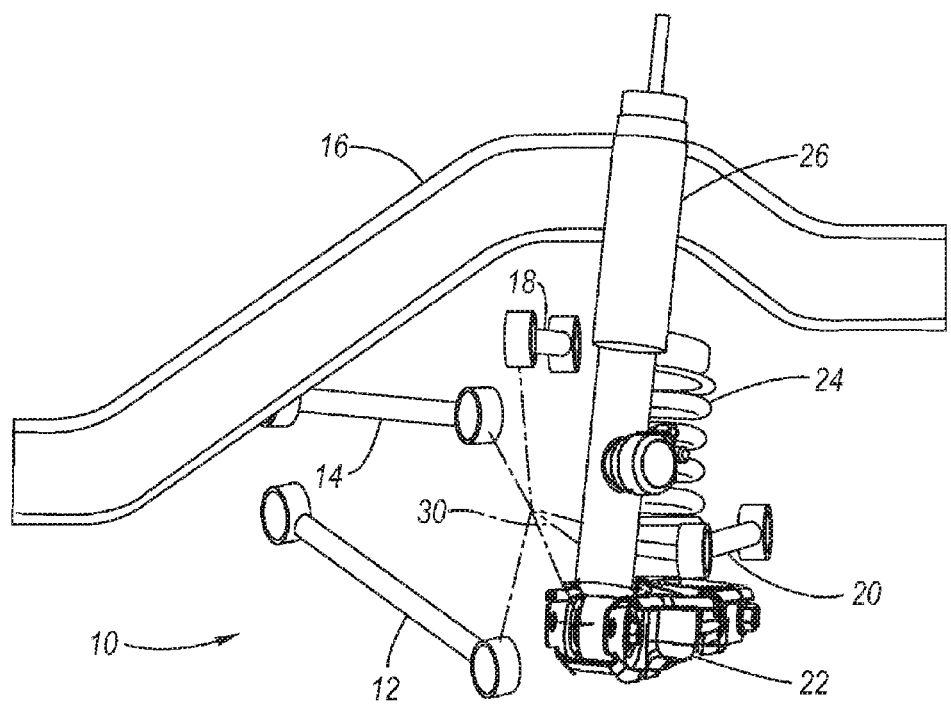
FIG. 1A is a side view of a conventional 5-link rear independent suspension, showing the body rail offset for the upper and lower trailing links thereof.

Referring now to the Drawing, FIGS. 2A through 4C depict examples of a decoupled 5-link independent rear suspension (IRS) 100 according to the present invention.

Figure 2A:
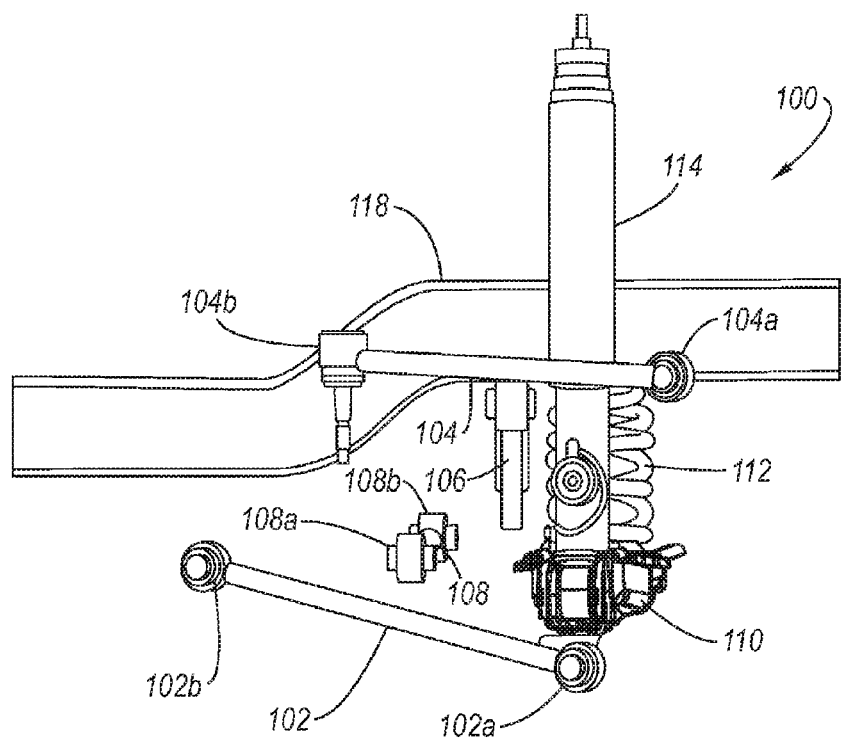
FIG. 2A is a side view of a decoupled 5-link independent rear suspension (IRS) according to the present invention, showing absence of body rail offset for the upper and lower trailing links thereof.
Figure 2B:
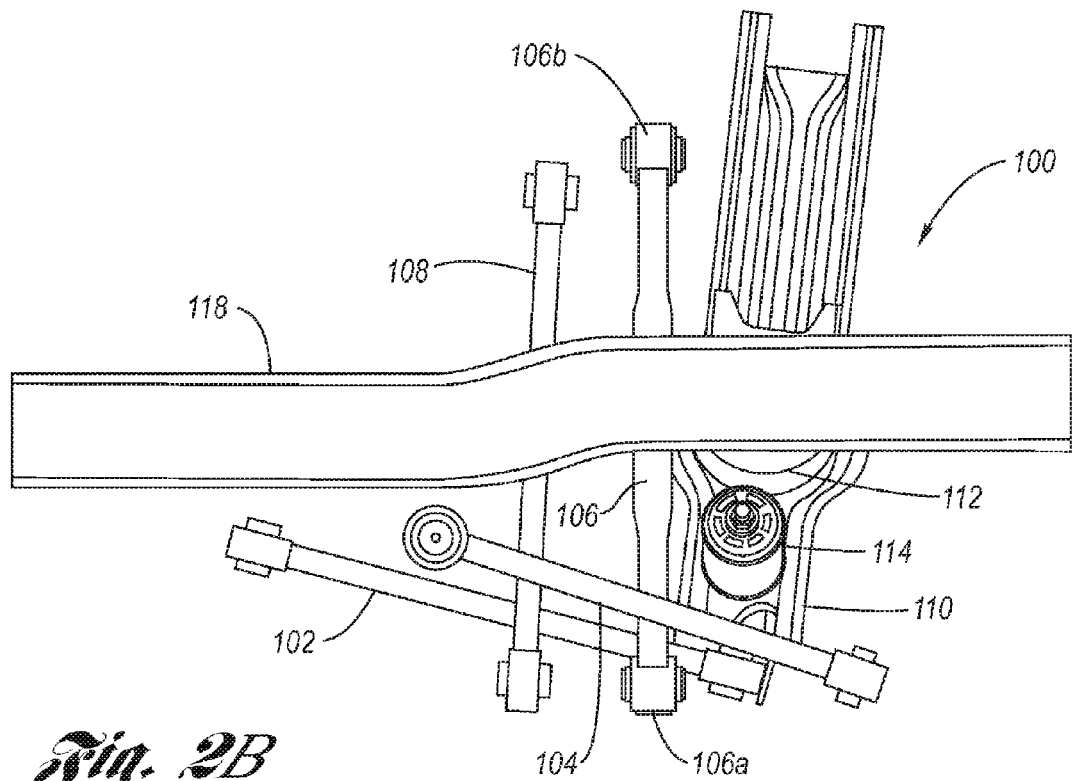
FIG. 2B is a top plan view of the decoupled 5-link IRS of FIG. 2A.

Referring firstly to FIGS. 2A and 2B, an example of the decoupled IRS 100 is depicted. A lower trailing link 102, having connection bushings 102a, 102b, and an upper trailing link 104, having connection bushings 104a, 104b, are longitudinally disposed linkages which serve to locate the wheel (not shown) longitudinally and react to tractive loads and brake torques. A camber link 106, having connection bushings 106a, 106b, a toe link 108, having connection bushings 108a, 108b, and a spring link 110, having connection bushings 110a, 110b (visible in FIG. 3A), provide wheel plane orientation and reaction to vertical and lateral loads. The linkages 102, 104, 106, 108 and 110 are connected via their respective connection bushings, to a wheel carrier at one end and a suspension frame at the other (see for example 120 and 202 of FIGS. 3B and 3C and 120' and 302 of FIGS. 4B and 4C). Also shown are a spring 112 and strut 114 showing their general spatial interrelationship with respect to the decoupled 5-link IRS 100. Note that only the lower and upper trailing links 102, 104 are associated with one another via an imaginary node 116 shown at FIG. 2C, which effectively focuses the trailing links to a predetermined optimal side view swing arm length and angle. According to an aspect of the present invention, the lower and upper trailing links 102, 104 are disposed outboard of the body rail 118, thus allowing for improved load reactions of the suspension system, as well as optimization of the body rail configuration and space accommodation for other vehicle components, such as for example fuel, batteries and exhaust.

Figure 1B:
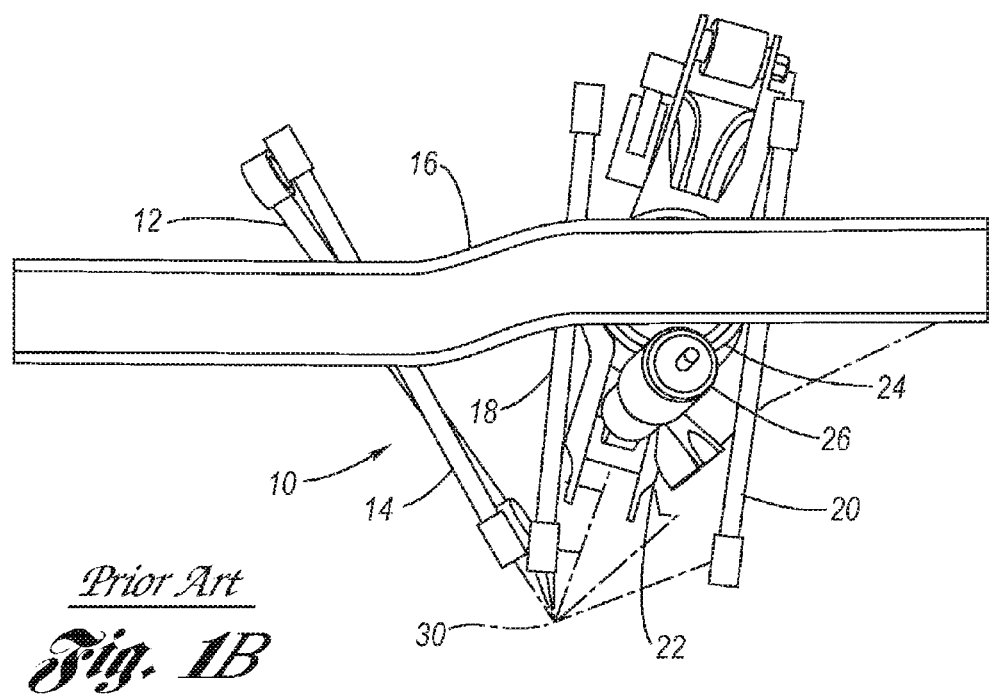
FIG. 1B is a top plan view of the conventional 5-link rear independent suspension of FIG. 1A.

In comparing the prior art 5-link IRS 10 of FIGS. 1A and 1B, which notably orients the forward upper linkage in a primarily lateral orientation which routes the linkage under the longitudinal body rail such that the body rail is required to be offset in order to clear the motion envelope of the linkage, to the decoupled 5-link IRS 100 of FIGS. 2A and 2B, which notably routes the trailing linkages in a primarily longitudinal direction disposed laterally outside the longitudinal body rail such that the body rail is inherently clear of the motion envelope of the linkage, advantageous changes in the present invention over the prior art include: 1) the trailing links plan view orientation is rotated out to locate the upper forward link attachment outboard of the body rail; 2) the trailing link knuckle attachment is moved aft to maximize link length with minimum suspension footprint; 3) the upper trailing link is routed to cross the upper lateral link so as to pass outboard of the shock absorber; and 4) the trailing links focus to a predetermined imaginary node (which node is different and separate from that of the lateral links) involving an optimized side view swing arm length and angle.

The topology of the decoupled 5-Link IRS 100 positions the trailing links 102, 104 in a much more longitudinal orientation, wherein the forward attachment 104a of the upper trailing link 104 is outboard of the body rail 118. The Decoupled 5-Link IRS 100 separates or decouples the load reactions of the suspension linkages: the three lateral linkages 106, 108, 110, establish the wheel plane orientation and react to vertical and lateral loads; and the two longitudinal linkages 102, 104 locate the wheel longitudinally and react to tractive loads and brake torques. In view that the trailing links 102, 104 are outboard of the body rail and clear the motion envelope of the linkages, the decoupled 5-Link IRS 100 enables more efficient body structure packaging, reduced suspension component loadings, and maximizes underfloor package space ahead of the rear axle.

Referring now to FIGS. 3A through 4C, examples of implementation applications of the decoupled 5-link IRS 100 will be described.

Depicted at FIG. 3A is a rear wheel drive suspension application utilizing the decoupled 5-link IRS 100, 100', wherein like functioning parts to those of FIGS. 2A and 2B are the same but now primed. In this regard, the toe link 108' is rear mounted; the upper trailing link 104' crosses under the camber link 106'; and the spring 112' is disposed over the shock 114' at the spring arm 110'.

Depicted at FIG. 3B is the suspension frame 202 adapted for interfacing with the rear wheel drive suspension application.

Figure 3C:
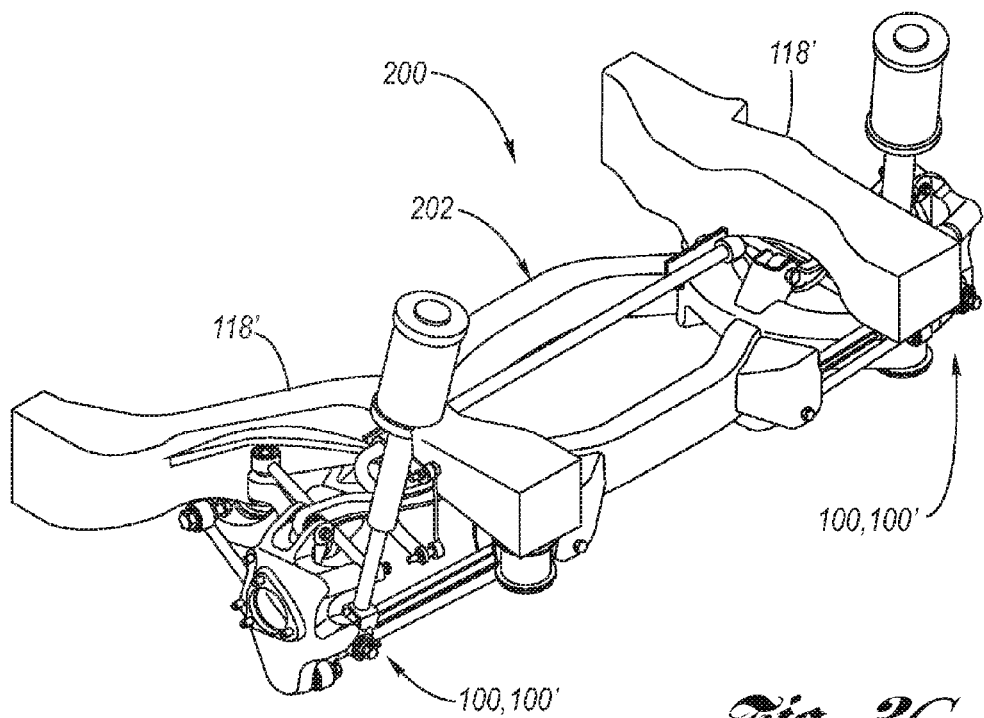
FIG. 3C is a perspective view of a decoupled 5-link IRS according to the present invention interfaced with the body rail of FIG. 3B.

FIG. 3C shows the assembled rear wheel drive suspension application 200.

Figure 4A:
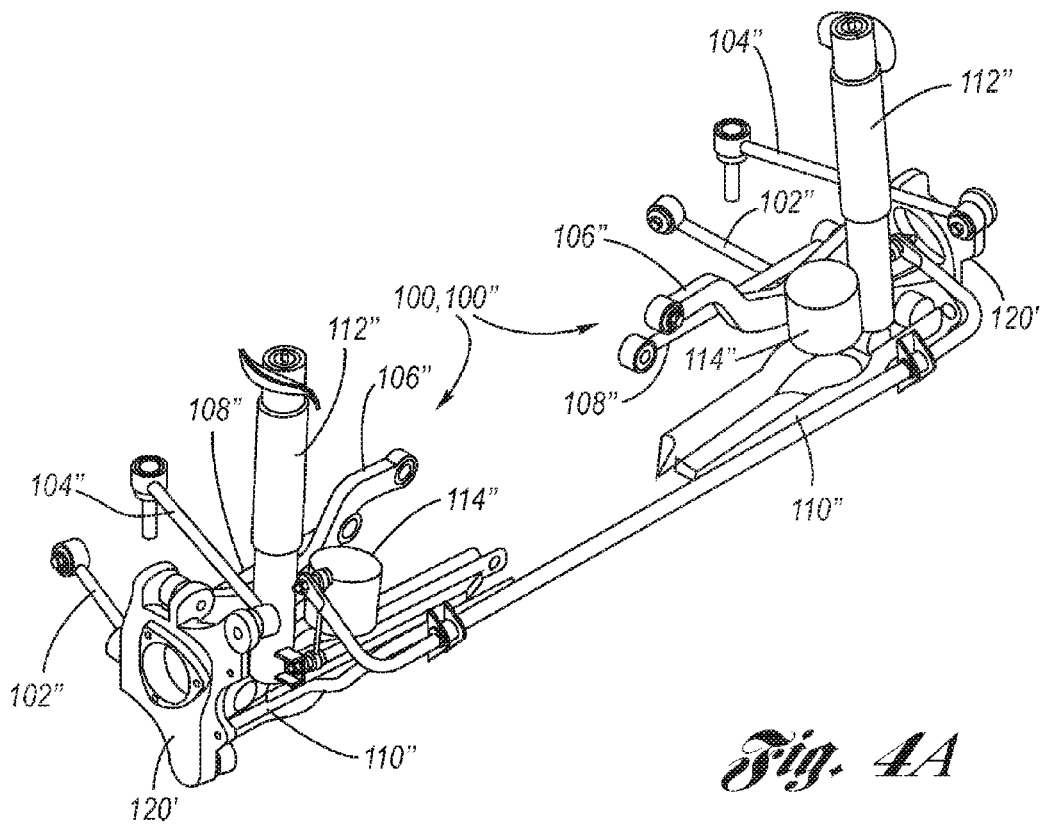
FIG. 4A is a perspective view of a decoupled 5-link IRS according to the present invention for a front wheel drive application.

Depicted at FIG. 4A is a front wheel drive suspension application utilizing the decoupled 5-link IRS 100, 100", wherein like functioning parts to those of FIGS. 2A and 2B are the same but now double-primed. In this regard, the toe link 108" is front mounted; the upper trailing link 104" crosses over the camber link 106"; and the spring 112" is disposed directly at the spring arm 110".

Figure 4B:
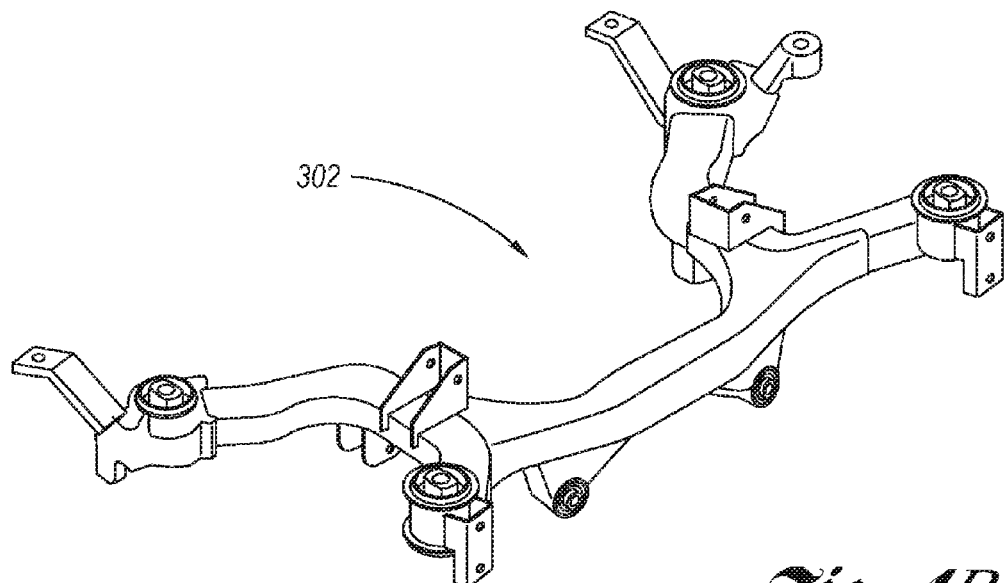
FIG. 4B is a perspective view of a body rail for a front wheel drive application.

Depicted at FIG. 4B is the suspension frame 302 adapted for interfacing with the front wheel drive suspension application.

Figure 4C:
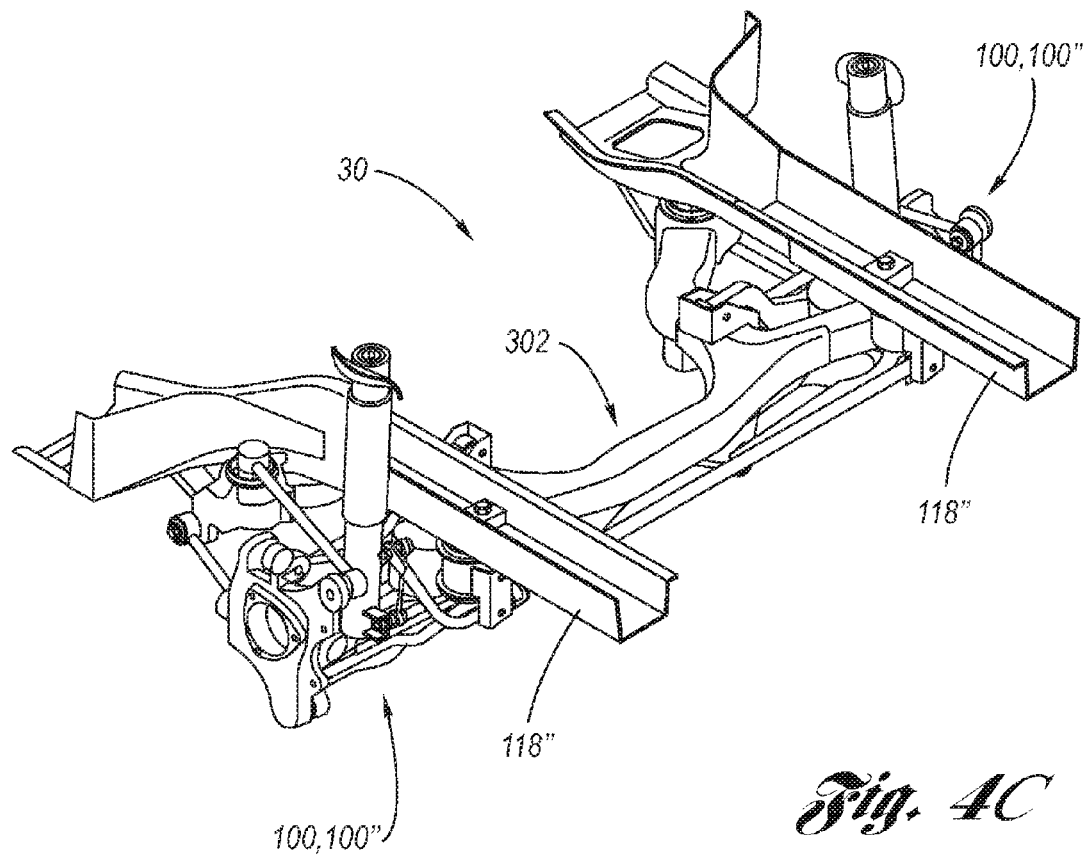
FIG. 4C is a perspective view of a decoupled 5-link IRS according to the present invention interfaced with the body rail of FIG. 4B.

FIG. 4C shows the assembled front wheel drive suspension application 300.

Example I

A "G Loads" comparison was performed of a decoupled 5-Link IRS generally similar to 100 of FIGS. 2A and 2B, as compared to a conventional 5-link IRS generally similar to 10 of FIGS. 1A and 1B, wherein the orientation of the trailing links was the only differing geometric parameter. Both configurations were "tuned" to similar kinematic and compliant SDF performances. The results are tabulated in Tables I and II, below.

TABLE I

Decoupled 5-Link IRS Geometry

| Left Side Point (Right Symmetrical Y) | Global X | Global Y | Global Z |
|---|---|---|---|
| Wheel Center | 3963 | −806 | 250.3 |
| Spindle Alignment | 3963 | −706 | 249.727 |
| Spring Arm @ Knuckle | 4003 | −728 | 154 |
| Spring Arm @ Subframe | 4053 | −301 | 184 |
| Camber Link @ Knuckle | 3978 | −722 | 400 |
| Camber Link @ Subframe | 4018 | −374 | 407 |
| LowerTrailing Link @ Knuckle | 3998 | −721 | 94 |
| LowerTrailing Link @ Subframe | 3617 | −625 | 185 |
| UpperTrailing Link @ Knuckle | 4098 | −695 | 346 |
| UpperTrailing Link @ Subframe | 3755 | −600 | 360 |
| Toe Link @ Knuckle | 4103 | −730 | 212 |
| Toe Link @ Subframe | 4158 | −275 | 238 |
| Shock Upper Mount @ Body | 4135 | −580 | 850 |
| Shock Lower Mount @ Spring Arm | 4013.25 | −640.465 | 160.15 |
| Spring Upper Seat @ Body | 4132.353 | −581.315 | 835 |
| Spring Lower Seat @ Lwr Shock Tube | 4097.585 | −598.582 | 638 |

TABLE I-continued

Decoupled 5-Link IRS Geometry

| | Delta X | Delta Y | Delta Z |
|---|---|---|---|
| Lower Trailing Link | 381 | −96 | −91 |
| Upper Trailing Link | 343 | −95 | −14 |

TABLE II

Conventional 5-Link IRS Geometry

| Left Side Point (Right Symmetrical Y) | Global X | Global Y | Global Z |
|---|---|---|---|
| Wheel Center | 3963 | −806 | 250.3 |
| Spiindle Alignment | 3963 | −706 | 249.727 |
| Spring Arm @ Knuckle | 4003 | −728 | 154 |
| Spring Arm @ Subframe | 4053 | −301 | 184 |
| Camber Link @ Knuckle | 3978 | −722 | 400 |
| Camber Link @ Subframe | 4018 | −374 | 407 |
| LowerTrailing Link @ Knuckle | 3928 | −722 | 113.8 |
| LowerTrailing Link @ Subframe | 37297 | −442 | 190.3 |
| UpperTrailing Link @ Knuckle | 3938 | −733 | 335.9 |
| UpperTrailing Link @ Subframe | 3795 | −455 | 351.7 |
| Toe Link @ Knuckle | 4103 | −730 | 213.5 |
| Toe Link @ Subframe | 4158 | −265 | 239 |
| Shock Upper Mount @ Body | 4135 | −580 | 850 |
| Shock Lower Mount @ Spring Arm | 4013.25 | −640.465 | 160.15 |
| Spring Upper Seat @ Body | 4132.353 | −581.315 | 835 |
| Spring Lower Seat @ Lwr Shock Tube | 4097.585 | −598.582 | 638 |

| | Delta X | Delta Y | Delta Z |
|---|---|---|---|
| Lower Trailing Link | 199 | −280 | −76.5 |
| Upper Trailing Link | 143 | −278 | −15.8 |

TABLE III

Static Load Maximum Tensile Left Side Link Axial Force (N)

| | Conventional 5-Link IRS | Decoupled 5-Link IRS |
|---|---|---|
| Spring Link (lower lateral) | 21458 | 13999 |
| Camber Link (upper lateral) | 7717 | 2234 |
| Toe Link | 2457 | 3483 |
| Lower Trailing Link | 12687 | 8362 |
| UpperTrailing Link | 12678 | 7661 |

TABLE IV

Static Load Maximum Compressive Left Side Link Axial Force (N)

| | Conventional 5-Link IRS | Decoupled 5-Link IRS |
|---|---|---|
| Spring Link (lower lateral) | 8061 | 11148 |
| Camber Link (upper lateral) | 9444 | 8655 |
| Toe Link | 7640 | 14692 |
| Lower Trailing Link | 10307 | 6586 |
| UpperTrailing Link | 10860 | 5886 |

It will be seen from the above Tables, that the longitudinal orientation of the trailing links in the decoupled 5-Link IRS reduced maximum axial loads in those links by 50% to 85% compared to the conventional 5-Link IRS. The "mechanical decoupling" of the trailing links from the lateral links also influenced maximum axial loads generated in the lateral links and reduced those loads by 10% to 50%.

To those skilled in the art to which this invention appertains, the above described preferred embodiments may be subject to change or modification. Such change or modification can be carried out without departing from the scope of the invention, which is intended to be limited only by the scope of the appended claims.

The invention claimed is:

1. A decoupled 5-link independent rear suspension disposed at a rear wheel corner adjacent a body rail of a motor vehicle, comprising:
   a wheel carrier;
   a camber link connected with said wheel carrier;
   a toe link connected with said wheel carrier;
   spring link connected with said wheel carrier;
   a lower trailing link connected to said wheel carrier; and
   an upper trailing link connected to said wheel carrier;
   wherein said lower and upper trailing links are disposed generally longitudinally in relation to the motor vehicle and disposed outboard of the adjacent body rail such that the adjacent body rail is clear of a motion envelope of the lower and upper trailing links during operation of the motor vehicle;
   wherein said camber link, said toe link and said spring link are decoupled with respect to said lower and upper trailing links; and
   wherein said upper trailing link crosses said camber link.

2. The decoupled 5-link independent rear suspension of claim 1, wherein said camber link, said toe link and said spring link are generally laterally disposed with respect to the motor vehicle.

3. The decoupled 5-link independent rear suspension of claim 2, wherein said lower and upper trailing links are mutually focused to a predetermined imaginary node in a direction away from said wheel carrier.

4. A decoupled 5-link independent rear suspension for a rear wheel drive application disposed at a rear wheel corner adjacent a body rail of a motor vehicle, comprising:
   a wheel carrier;
   a camber link connected with said wheel carrier;
   a toe link connected with said wheel carrier;
   spring link connected with said wheel carrier;
   a lower trailing link connected to said wheel carrier; and
   an upper trailing link connected to said wheel carrier;
   wherein said lower and upper trailing links are disposed generally longitudinally in relation to the motor vehicle and disposed outboard of the adjacent body rail such that the adjacent body rail is clear of a motion envelope of the lower and upper trailing links during operation of the motor vehicle;
   wherein said toe link has a rear mounting disposition in relation to said wheel carrier;
   wherein said camber link, said toe link and said spring link are decoupled with respect to said lower and upper trailing links; and
   wherein said upper trailing link crosses under said camber link.

5. The decoupled 5-link independent rear suspension of claim 4, wherein said camber link, said toe link and said spring link are generally laterally disposed with respect to the motor vehicle.

6. The decoupled 5-link independent rear suspension of claim 5, wherein said lower and upper trailing links are mutually focused to a predetermined imaginary node in a direction away from said wheel carrier.

7. A decoupled 5-link independent rear suspension for a front wheel drive application disposed at a rear wheel corner adjacent a body rail of a motor vehicle, comprising:
   a wheel carrier;
   a camber link connected with said wheel carrier;
   a toe link connected with said wheel carrier;
   spring link connected with said wheel carrier;
   a lower trailing link connected to said wheel carrier; and
   an upper trailing link connected to said wheel carrier;
   wherein said lower and upper trailing links are disposed generally longitudinally in relation to the motor vehicle and disposed outboard of the adjacent body rail such that the adjacent body rail is clear of a motion envelope of the lower and upper trailing links during operation of the motor vehicle;
   wherein said toe link has a front mounting disposition in relation to said wheel carrier;
   wherein said camber link, said toe link and said spring link are decoupled with respect to said lower and upper trailing links; and
   wherein said upper trailing link crosses over said camber link.

8. The decoupled 5-link independent rear suspension of claim 7, wherein said camber link, said toe link and said spring link are generally laterally disposed with respect to the motor vehicle.

9. The decoupled 5-link independent rear suspension of claim 8, wherein said lower and upper trailing links are mutually focused to a predetermined imaginary node in a direction away from said wheel carrier.

* * * * *